(12) United States Patent
Hu et al.

(10) Patent No.: US 9,048,982 B2
(45) Date of Patent: Jun. 2, 2015

(54) METHOD FOR DISTRIBUTED INTERFERENCE COORDINATION IN A FEMTOCELL ENVIRONMENT

(71) Applicant: EMPIRE TECHNOLOGY DEVELOPMENT LLC, Wilmington, DE (US)

(72) Inventors: Fanglong Hu, Beijing (CN); Kan Zheng, Beijing (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/028,384

(22) Filed: Sep. 16, 2013

(65) Prior Publication Data

US 2014/0038627 A1    Feb. 6, 2014

Related U.S. Application Data

(63) Continuation of application No. 13/576,916, filed on Aug. 2, 2012, now Pat. No. 8,538,339.

(51) Int. Cl.
*H04B 1/00* (2006.01)
*H04L 5/00* (2006.01)
(Continued)

(52) U.S. Cl.
CPC ............ *H04L 5/0032* (2013.01); *H04L 5/0073* (2013.01); *H04W 72/0453* (2013.01); *H04W 72/082* (2013.01); *H04W 84/045* (2013.01)

(58) Field of Classification Search
CPC ............... H04W 72/0453; H04W 72/0473; H04W 72/082; H04W 84/05; H04W 72/085; H04W 72/0426; H04W 28/048; H04W 24/10

USPC ............... 455/414.1, 432.3, 435.2, 443, 444, 455/452.1, 452.2, 453, 449, 63.1, 63.2, 455/67.13, 501, 422.1, 450; 370/328, 329, 370/331, 332, 335
See application file for complete search history.

(56) References Cited

U.S. PATENT DOCUMENTS 6,157,811 A    12/2000  Dent
7,130,262 B1   10/2006  Cortez et al.
(Continued)

FOREIGN PATENT DOCUMENTS

CN    101064865 A    10/2007
CN    101772176 A     7/2010
(Continued)

OTHER PUBLICATIONS

International Search Report & Written Opinion dated Feb. 16, 2012 as received in application No. PCT/CN2011/073637.
(Continued)

*Primary Examiner* — Jean Gelin
(74) *Attorney, Agent, or Firm* — Maschoff Brennan

(57) ABSTRACT

Distributed inter-cell interference coordination in a communications system can include: at one other femtocell system, sending channel quality information of a subordinate device communicating with the other femtocell system to the first femtocell system; receiving the channel quality information of the at least one other femtocell system at the first femtocell system; estimating an influence of a use of a resource on the communications system at the first femtocell system according to the channel quality information received by one or more of the at least one other femtocell system; and determining at the first femtocell system whether to use the resource.

20 Claims, 8 Drawing Sheets

(51) Int. Cl.
*H04W 72/08* (2009.01)
*H04W 72/04* (2009.01)
*H04W 84/04* (2009.01)

(56) References Cited

U.S. PATENT DOCUMENTS

| | | |
|---|---|---|
| 8,169,933 B2 | 5/2012 | Srinivasan et al. |
| 8,385,832 B2 | 2/2013 | Johansson et al. |
| 2003/0179731 A1 | 9/2003 | Noguchi et al. |
| 2006/0019679 A1 | 1/2006 | Rappaport et al. |
| 2008/0293404 A1 | 11/2008 | Scherzer et al. |
| 2010/0177722 A1 | 7/2010 | Guvenc |
| 2010/0203882 A1 | 8/2010 | Frenger et al. |
| 2010/0222069 A1 | 9/2010 | Abraham et al. |
| 2010/0246483 A1 | 9/2010 | Erceg et al. |
| 2010/0265918 A1 | 10/2010 | Marinier et al. |
| 2011/0086641 A1 | 4/2011 | Guvenc et al. |
| 2011/0141925 A1 | 6/2011 | Velenko et al. |
| 2011/0151886 A1 | 6/2011 | Grayson et al. |
| 2011/0170496 A1 | 7/2011 | Fong et al. |
| 2011/0280205 A1 | 11/2011 | Qin et al. |
| 2012/0196644 A1 | 8/2012 | Scherzer et al. |
| 2012/0263067 A1 | 10/2012 | Kim et al. |

FOREIGN PATENT DOCUMENTS

| | | |
|---|---|---|
| CN | 101834701 A | 9/2010 |
| CN | 101895891 A | 11/2010 |
| CN | 101998412 A | 3/2011 |

OTHER PUBLICATIONS

Ellenbeck, et al., "Decentralized Inter-Cell Interference Coordination by Autonomous Spectral Reuse Decisions", pp. 7.

Karla, "Distributed Algorithm for Self Organizing LTE Interference Coordination", p. 1.

"Global Femtocell Market (2009-2014)," Mar. 2010, accessed at http://www.marketsandmarkets.com/Market-reports/femtocell-advanced-technologies-and-global-market-59.html.

CMCC "Downlink interference coordination between Femto cells", 3GPP Draft; R1-102160, Apr. 7, 2010.

European Search Report dated Sep. 22, 2014 in application No. 11864743.7.

Nokia Siemens Networks, Nokia, "Inter eNB over-the-air communication (OTAC) for LTE-Advanced," 3GPP TSG RAN WG1 #57 Meeting, R1-091777, pp. 1-5 (May 4, 2009).

Nokia Siemens Networks, Nokia "Primary Component Carrier Selection, Monitoring, and Recovery" 3GPP TSG RAN WG1 #57 Meeting, R1-091779, pp. 1-6 (May 4, 2009).

Boudreau et al., "Interference coordination and cancellation for 4G networks", IEEE Communications Magazine, vol. 47, Issue 4, Apr. 2009, pp. 74-81.

METHOD FOR DISTRIBUTED INTERFERENCE COORDINATION IN A FEMTOCELL ENVIRONMENT

CROSS-REFERENCE TO RELATED APPLICATION

This patent application filing under 35 U.S.C. §120 claims priority to and the benefit of U.S. patent application Ser. No. 13/576,916 filed Aug. 2, 2012, now U.S. Pat. No. 8,538,339, which is incorporated herein by reference in its entirety.

BACKGROUND

A femtocell is a small cellular base station that can be configured to be used indoors, such as within a home or small business, to provide a signal to a mobile device, such as a mobile phone or portable computer with a mobile card or modem. The femtocell is configured to tie into a service provider network broadband connection, such as DSL or cable. The femtocell can be configured to support various numbers of mobile devices; however, current designs usually support 2 to 4 active mobile devices in a residential setting, and 8 to 16 active mobile devices in small business settings (i.e., enterprise setting). A femtocell allows service providers to extend service coverage indoors, especially where access would otherwise be limited or unavailable. The femtocell can be configured for WCDMA, GSM, CDMA2000, TD-SCDMA, WiMAX, and LTE standards.

Femtocells are an alternative way to deliver the benefits of fixed-mobile convergence (FMC). The distinction is that most FMC architectures require a new (e.g., dual-mode) mobile device which works with existing unlicensed spectrum home/enterprise wireless access points, while a femtocell-based deployment will work with existing mobile devices, but requires installation of a femtocell access point that uses licensed spectrum.

Generally, a femtocell provides coverage on the order of 10 s of meters or less, usually about 50 meters to about 30 meters or less. As such, a femtocell environment is typically the size of a residential gateway or smaller, and the femtocell access point connects to a broadband line. Integrated femtocells can include both a DSL router and femtocell. When mobile devices arrive under coverage of the femtocell, they switch over from the macrocell (e.g., outdoor) to the femtocell (e.g., indoor) automatically. All communications then automatically go through the femtocell. When the user leaves the femtocell coverage area, the mobile device hands over seamlessly to the macrocell network. Femtocells require specific hardware, so existing WiFi or DSL routers cannot be upgraded to a femtocell.

Some of the benefits that a femtocell can provide for an end-user include: so-called "5 bar" coverage when there would otherwise be no existing signal or poor coverage; it can provide higher mobile data capacity, which can be important when the end-user makes use of mobile data on their mobile device; and the femtocell can have a functionality and interface that is similar to regular HSPA or LTE base stations, except for a few additional functions with a significantly reduced coverage area.

The placement of a femtocell has a critical effect on the performance of the wider network, and this is a key issue to be addressed for successful deployment. The placement of multiple femtocells in close proximity can impede performance due to the overlap of signal channels, which can cause two femtocells to compete for the same signal channel. Since femtocells can use the same frequency bands, there can be problems with adjacent femtocells interfering with each other to reduce functionality rather than improving functionality.

For example, in order to solve the problems of indoor network coverage, an LTE-A network can incorporate a femtocell, such as a Home Node B (HNB) system or a Home e-Node B (HeNB) system. In this example, a plurality of HeNBs can be densely distributed in a network, which results in the formation of serious interferences between different HeNBs in close proximity. The interference can even cause the nodes in the network to fail to communicate with each other. Uncertainties of the disposition and on-offs of the HeNBs can lead to high randomness of the interferences among the HeNBs.

Attempts have been made to reduce the interference between proximal femtocells. A traditional centralized inter-cell interference coordination technology is limited by its flexibility and transmission delay, and may not rapidly track changes of the interferences between the femtocells. Also, interactions frequently occur among the proximal femtocells, and signaling overhead is high. This can result in the inter-cell interference coordination technology of the traditional cellular network being insufficient for reducing interference between proximal femtocells.

SUMMARY

In one embodiment, a method is provided for distributed inter-cell interference coordination in a communications system including at least a first femtocell system and at least one other femtocell system. The method can include: at one or more other femtocell systems, sending channel quality information $\gamma_i$ of a subordinate device communicating with the other femtocell system to the first femtocell system; receiving the channel quality information $\gamma_i$ of the other femtocell system at the first femtocell system; estimating an influence of a use of a resource on the communications system at the first femtocell system according to the channel quality information $\gamma_i$ received by one or more of other femtocell systems; and determining at the first femtocell system whether to use the resource.

The first femtocell system can refer to any femtocell system of a plurality of proximal femtocells. As such, each of the proximal femtocell systems can operate as the first femtocell system. Thus, the first femtocell system is not a specific femtocell system, but rather a point of reference between a plurality of femtocell systems. Each femtocell system can include a femtocell device that communicates across the available channels. The femtocell system can include a Home Node B (HNB) system or a Home e-Node B (HeNB) system.

In one embodiment, a communications system for distributed inter-cell interference coordination can include a first femtocell (e.g., HeNB) system, and one or more other femtocell systems configured to send channel quality information $\gamma_i$ of a subordinate device communicating with the other femtocell system to the first femtocell system. The first femtocell system can be configured to receive the channel quality information $\gamma_i$ of the at least one other femtocell system at the first femtocell system. The first femtocell system can then estimate an influence of a use of a resource on the communications system at the first femtocell system according to the channel quality information $\gamma_i$ received by one or more of the other femtocell systems. The first femtocell system can then determine whether to use the resource.

In one embodiment, the first femtocell system can include a computing unit configured as a femtocell access point device. The computing unit can be capable of executing a series of executable instructions stored in a tangible medium in order to perform various femtocell protocols. With regard to reducing interference between proximal femtocell systems, the first femtocell system can implement the following steps: receiving channel quality information $\gamma_i$ of another femtocell system at the first femtocell system; estimating an influence of a use of a resource on the communications system at the first femtocell according to the channel quality information $\gamma_i$ received by one or more other femtocell systems; and determining at the first femtocell whether to use the resource.

In one embodiment, a method is provided for distributed inter-cell interference coordination in a first femtocell system (e.g., HeNB). Such a method can include: receiving, at the first femtocell system, channel quality information $\gamma_i$ of a subordinate device communicating with one or more other femtocell systems interfering with the first femtocell in a communications network; estimating an influence of a use of a resource on the communications system according to the channel quality information $\gamma_i$ received from one or more other femtocell systems; and determining whether to use the resource.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
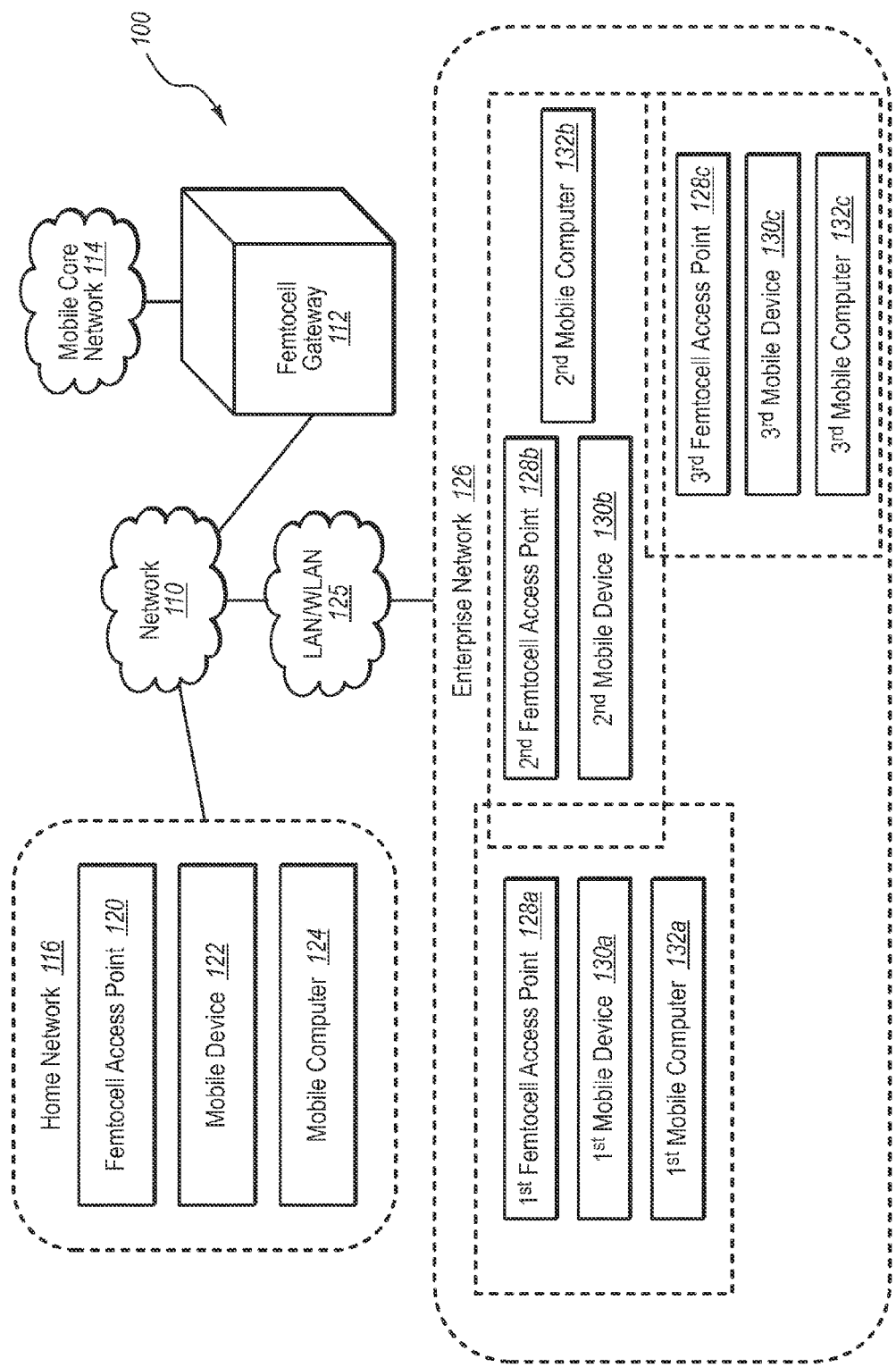
FIG. 1 includes a schematic representation of a high level femtocell network architecture.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Due to the significant problems that arise resulting from femtocell network interference, there is a need to provide a distributed inter-cell interference coordination technology. By adopting a successful distributed inter-cell interference coordination technology in the femtocell network, each femtocell system can change resource usage according to the information obtained from proximal femtocell systems. The exchange of information between femtocell systems can allow for changes of in inter-cell interferences to be rapidly tracked with a low signaling overhead. That is, the distributed inter-cell interference coordination technology does not impact the available bandwidth as much as a centralized technology. The inter-cell interferences can be effectively reduced by the distributed inter-cell interference coordination technology, and the performance (e.g., receiving performance) of the network can be enhanced.

While femtocell systems are described herein with regard to the advance in communications technology, the $3^{rd}$ Generation Partnership Project (3GPP) refers to 3G femtocells as Home Node B (HNB) for WCDMA and Home e-Node Bs (HeNB) for LTE. With regard to LTE, a femtocell therefor refers to a HeNB system. With regard to WCDMA, a femtocell therefor refers to a HNB. A goal of the 3GPP Long Term Evolution (LTE) program is to develop new technology, new architecture and new methods for LTE settings and configurations in order to provide improved spectral efficiency, reduced latency, and better utilization of radio resources for faster user experiences and richer applications and services with less cost. As part of these efforts, the 3GPP has introduced the concept of an in-home HeNB for LTE networks and in-home HNB for wideband code division multiple access (WCDMA).

The present technology can be generalized for femtocells that have the capability of downlink receiving. Also, the present technology can be performed by implementing an ICIC algorithm, which is useful for femtocells in close proximity, but may not be useful for communication platforms that are located at longer distances with respect to each other. As such, the technology may not apply to e-Node B (eNB) or other large-scale base station communication platforms that transmit over long distances.

The technology may also be useful in microcells and picocells, but only when the microcells and picocells operate similarly with the HNBs and NeNB, such as when capable of implementing downlink receiving and/or capable of implementing the ICIC algorithm. Typically, the range of a microcell is less than two kilometers wide down to about 200 meters, and a picocell range is about 200 meters to about 100 meters. On the other hand, femtocells are much smaller, such as on the order of 10 s of meters or less, usually about 50 meters to about 30 meters or less.

Generally, the technology is provided for distributed inter-cell interference coordination in a communications system including at least a first femtocell system (e.g., first HeNB system) of a first femtocell environment and at least one other femtocell system (e.g., second HeNB system) of the first femtocell environment or other environment, such as a second femtocell environment. The other femtocell system can be a second femtocell system, a third femtocell system, and so on. A femtocell environment can have one or more operational femtocell systems, and adjacent femtocell environments can overlap within the communications system. A femtocell system can include one or more devices configured together to perform a femtocell function. A femtocell access point can include a femtocell system.

In one embodiment, the method can include: at one or more of the other femtocell systems (e.g., not the first femtocell system), sending channel (e.g., one or more channels) quality information $\gamma_i$ of a subordinate device (e.g., mobile phone or mobile computing device) communicating with at least one of the other femtocell systems to the first femtocell system; receiving the channel quality information $\gamma_i$ of one or more of the other femtocell systems at the first femtocell system; estimating an influence of a use of a resource on the first femtocell system according to the channel quality information $\gamma_i$ received by one or more of the other femtocell systems; and determining at the first femtocell system whether to use the resource.

FIG. 1 provides a schematic representation of a femtocell environment 100 that includes a network 110 that operably couples a femtocell gateway 112 and mobile core network 114 to a home network 116 and to an enterprise network 126 through a LAN/WLAN 125. The home network 116 is shown to have a femtocell access point 120, which is generally referred to herein as a femtocell system. A femtocell system can include one or more devices that cooperatively operate as a femtocell access point 120. The femtocell system can also be referred to as a femtocell device as it is operably coupled with a broadband network 110. The femtocell access point 120 communicates with a mobile device 122, such as a mobile phone, and with a mobile computer 124 that has mobile network capabilities, such as through a mobile card or mobile USB plugin. In this setup, there is only one femtocell access point 120 for the home network 116, and thereby there may not be any interference between femtocell access points 120. On the other hand, if the home having the home network 116 is in a high density residence area, other homes may have other home networks 116 with femtocell access points 120 that may interfere with each other. The dashed line box of the home network 116 represents the cell coverage area of the femtocell access point 120.

The enterprise network 126 is shown to be operably coupled with the network 110 through a LAN/WLAN 125, which is optional. The enterprise network 126 may be operably coupled directly to the network 110. The enterprise network 126 is shown to have a first femtocell access point 128a, a second femtocell access point 128b, and a third femtocell access point 128c; however, any number of femtocell access points may be present in close proximity. The enterprise network 126 can be a single business entity or can include multiple businesses in close proximity, such as in an office building. The first femtocell access point 128a can be in communication with a first mobile device 130a and a first mobile computer 132a. The second femtocell access point 128b can be in communication with a second mobile device 130b and a second mobile computer 132b. The third femtocell access point 128c can be in communication with a third mobile device 130c and a third mobile computer 132c. The femtocell access points 128a,b,c may be exemplified by HNB or HeNB systems.

The enterprise network 126 is shown to have a dashed line box, which represents the broad cell coverage area of the femtocell access points 128a,b,c. Each femtocell access point 128a,b,c has a cell coverage area represented by the dashed boxes that overlap. This overlap of cell coverage can create unwanted interference between the different femtocell access points 128a,b,c.

Each femtocell access point 120 can include hardware and software configured for one or more of the following: protocols covering LTE HeNB and 3G HNB; data and control performance aligned with High Speed Packet Access (HSPA), HSPA+ and LTE latency and data throughput standards; a femtocell reference application; integrated protocol stacks; and any other femtocell functionality, such as those known and/or described herein or developed.

Figure 2:
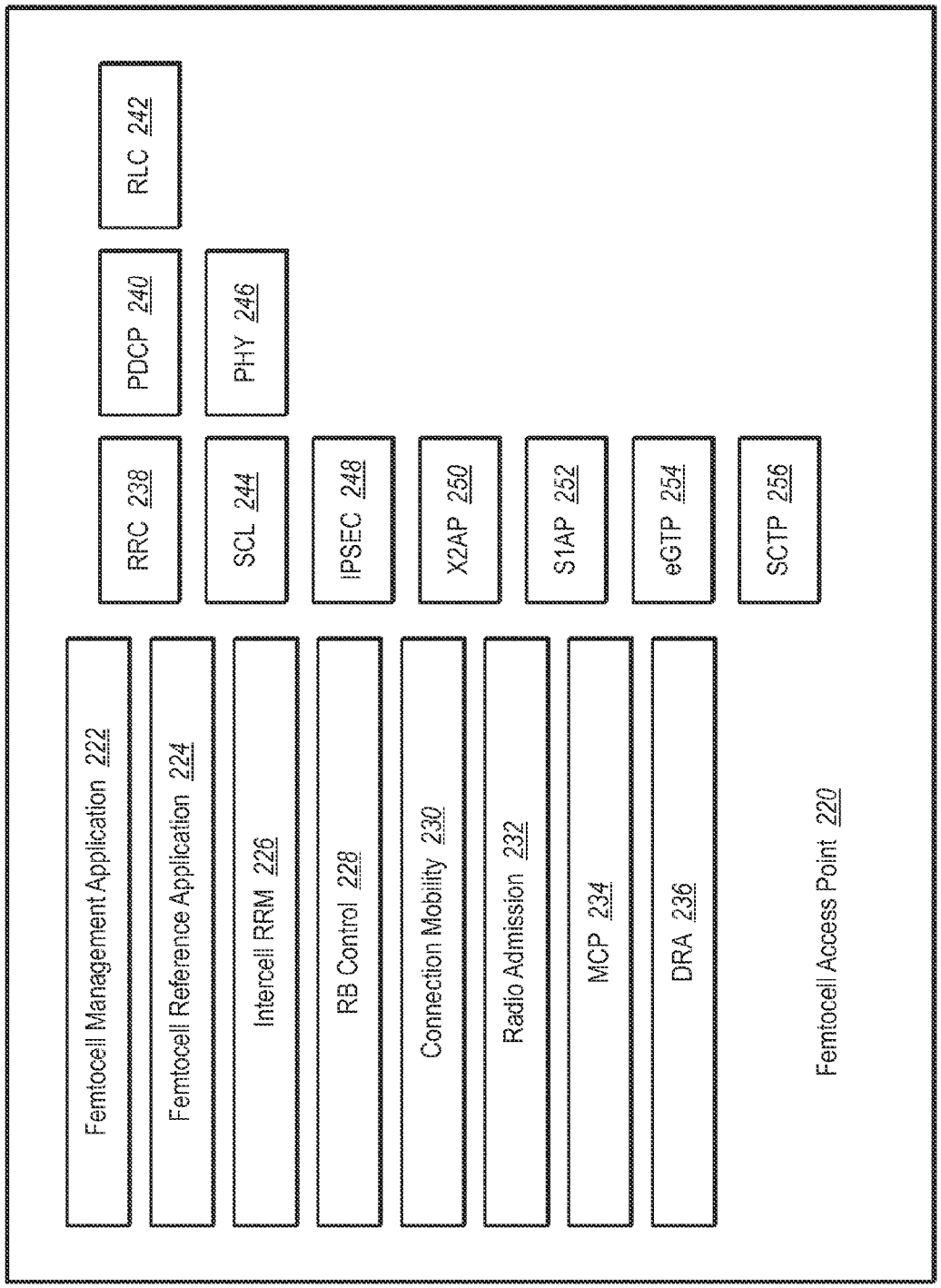
FIG. 2 includes a schematic representation of a femtocell system.

FIG. 2 provides a schematic representation of a femtocell access point 220 configured as a HeNB system. The femtocell access point 220 can have some of the following: a femtocell management application module 222; a femtocell reference application module 224; an inter-cell radio resource management (RRM) module 226; a resource block (RB) control module 228; a connection mobility module 230; a radio admission module 232; a monitoring center performance (MCP) module 234; a dynamic resource allocation (DRA) module 236; a radio resource controller (RRC) module 238; a packet data convergence protocol (PDCP) module 240; a radio link control (RLC) module 242; a silicon convergence layer (SCL) module 244; a physical layer (PHY) module 246; an internet protocol security (IPSEC) module 248; a X2 application protocol (X2AP) 250; S1 application protocol (S1AP) module 252; an enhanced general packet radio service (GPRS) tunneling protocol (eGTP) module 254; and stream controlled transmission protocol (SCTP) module 256. The aforementioned components of the femtocell access point 220 are well known to one of ordinary skill in the art. The femtocell access point 220 configured as illustrated and described in connection to FIG. 2 can implement the methods described herein in order to reduce interference between adjacent femtocells. The illustrated femtocell access point 220 can be a HeNB system as configured.

Figure 3:
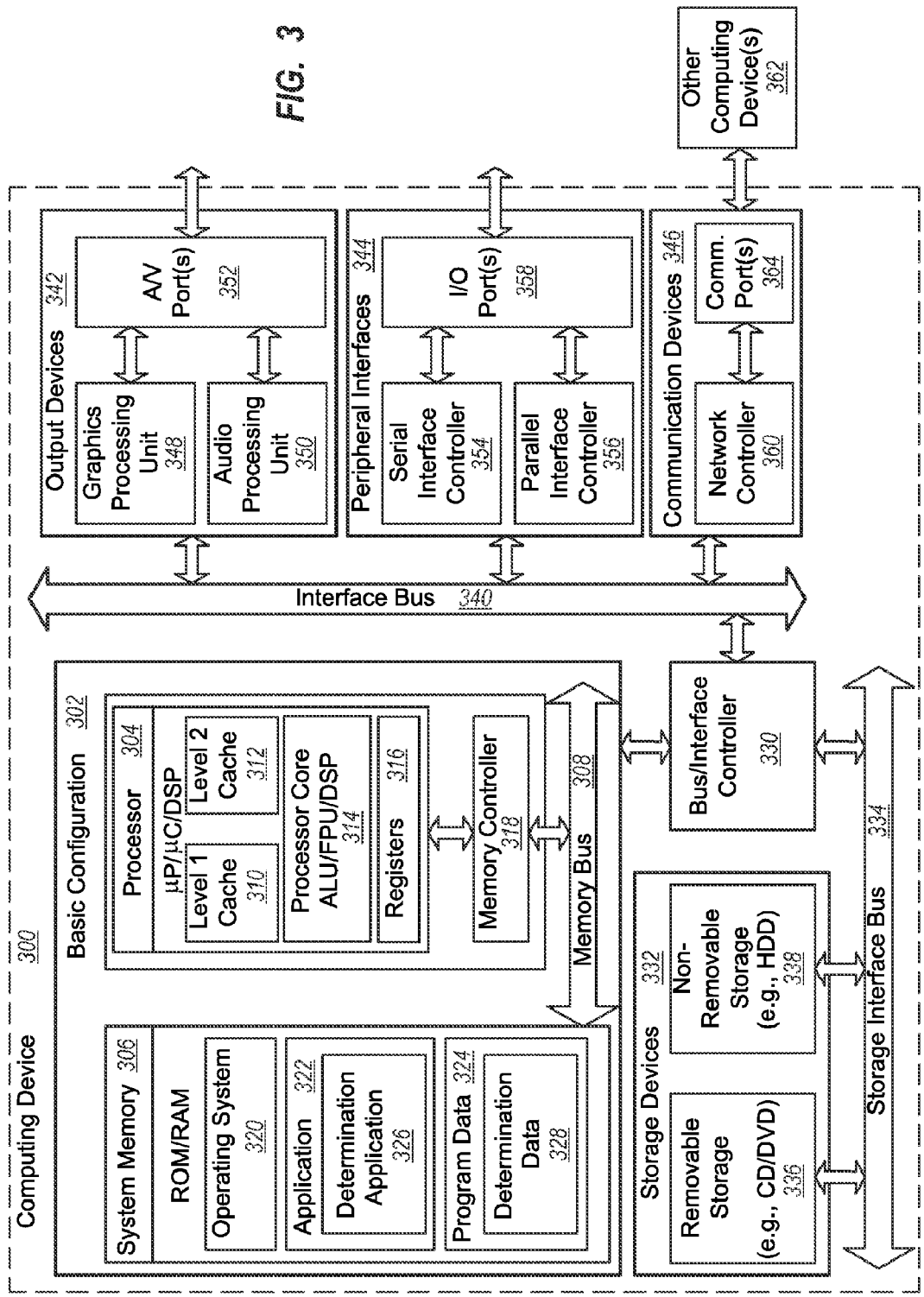
FIG. 3 includes a schematic representation of a computing system that can be used with a femtocell system.

FIG. 3 provides a schematic representation of a computing system 300 that can be implemented as a femtocell system in accordance with the disclosure provided herein. The computing system 300 of FIG. 3 is described in more detail below.

Figure 4:
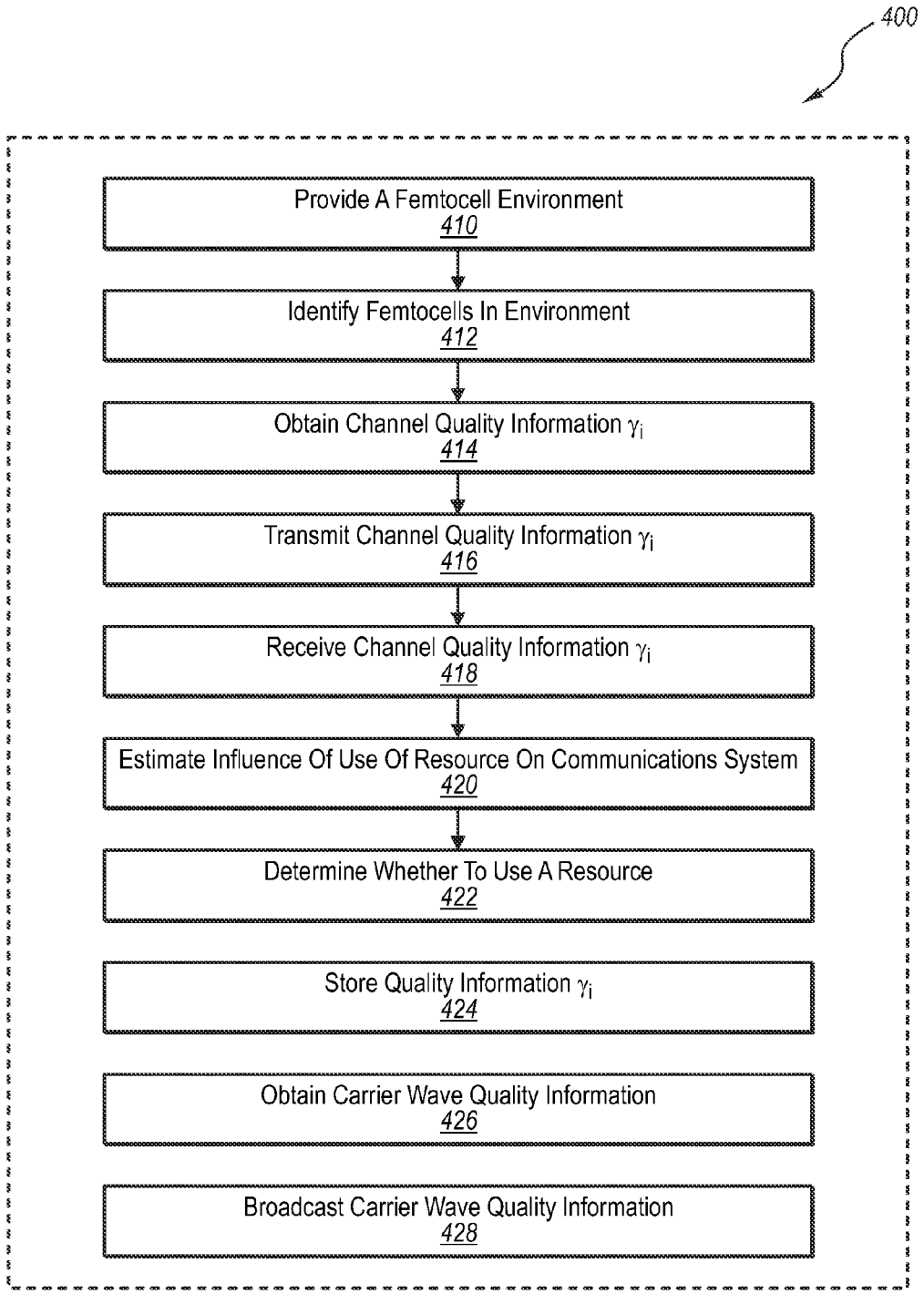
FIG. 4 includes a flow diagram representing an embodiment of a method for reducing interference between femtocell systems in a femtocell environment.

FIG. 4 provides a flow diagram of a method 400 for reducing inter-cell femtocell interference. The method 400 can be implemented by a HeNB femtocell access point 220 of FIG. 2 as well as an HNB having downlink receiving capability and being configured to implement an ICIC algorithm. The method 400 may be implanted in a femtocell environment 100 of FIG. 1. Generally, the method 400 can be used for distributed inter-cell interference coordination in a communications system including at least a first femtocell system and at least one other femtocell system. The method 400 can include providing a femtocell environment having two or more femtocell systems ("PROVIDE A FEMTOCELL ENVIRONMENT," block 410), which can be located within an interference area. The femtocell systems can be identified by a first femtocell system and at least one other femtocell system ("IDENTIFY FEMTOCELLS IN ENVIRONMENT," block 412), which may or may not have interference between each other. The other femtocell systems can then obtain channel quality information $\gamma_i$ of a subordinate device, such as a mobile phone, that is communicating with one of the other femtocell systems, such as the first femtocell system ("OBTAIN CHANNEL QUALITY INFORMATION $\gamma_i$," block 414). The other femtocell system can then transmit the obtained channel quality information $\gamma_i$ of the subordinate device to the first femtocell system ("TRANSMIT CHANNEL QUALITY INFORMATION $\gamma_i$," block 416). The first femtocell system can then receive the channel quality information $\gamma_i$ regarding the subordinate device communication with the other femtocell system ("RECEIVE CHANNEL QUALITY INFORMATION $\gamma_i$," block 418). Once the channel quality information $\gamma_i$ regarding the communication between the subordinate device and the other femtocell system is received, the first femtocell system can then estimate an influence of a use of a resource on the communications system according to the channel quality information $\gamma_i$ provided by the other femtocell system ("ESTIMATE INFLUENCE OF USE OF RESOURCE ON COMMUNICATIONS SYSTEM," block 420). The first femtocell includes hardware and/or software that can be configured to process the channel quality information $\gamma_i$ to obtain useful information and make appropriate determinations. The first femtocell system can use the available information and determine whether to use the resource, such as a particular channel being used by the subordinate device and the other femtocell system ("DETERMINE WHETHER TO USE A RESOURCE," block 422).

During the method 400 of FIG. 4, other processes and functions can be implemented by the femtocell systems of the femtocell environment. As such, the various femtocell systems can store the channel quality information $\gamma_i$ on a data storage medium ("STORE QUALITY INFORMATION," block 424). For example, the first femtocell system can store the channel quality information $\gamma_i$ on a computing system-readable medium. The dashed line box of FIG. 4 illustrates that the other processes may be optional in various configurations, and may be performed at various times through the method 400, and thereby the other processes are not linked via the flow chart.

The channel quality information can be obtained for each carrier wave of the femtocell environment ("OBTAINING CARRIER WAVE QUALITY INFORMATION," block 426). The channel quality information $\gamma_i$ for each carrier wave k can then be broadcast from one femtocell system to another femtocell system, such as a proximal femtocell system in the femtocell environment ("BROADCAST CARRIER WAVE QUALITY INFORMATION," block 428). The ability of the femtocell systems to pass information between each other in order to reduce interference is more effective than a central system that directly controls each femtocell system. The distributed communication allows the femtocell systems to adjust their carrier waves k in use on the fly. The method 400 for distributed inter-cell interference coordination can include the following processes performed by the femtocells: at one or more of the other femtocell systems, sending channel quality information $\gamma_i$ of a subordinate device communicating with the other femtocell system to the first femtocell system; receiving the channel quality information $\gamma_i$ of the other femtocell system at the first femtocell system; estimating an influence of a use of a resource on the communications system at the first femtocell system according to the channel quality information $\gamma_i$ received by one or more of the other femtocell systems; and determining at the first femtocell system whether to use the resource.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Of course, all of the methods described herein can be combined, and the individual processes can be separated and alternately combined in order to reduce inter-cell interference in a femtocell environment.

Figure 5A:
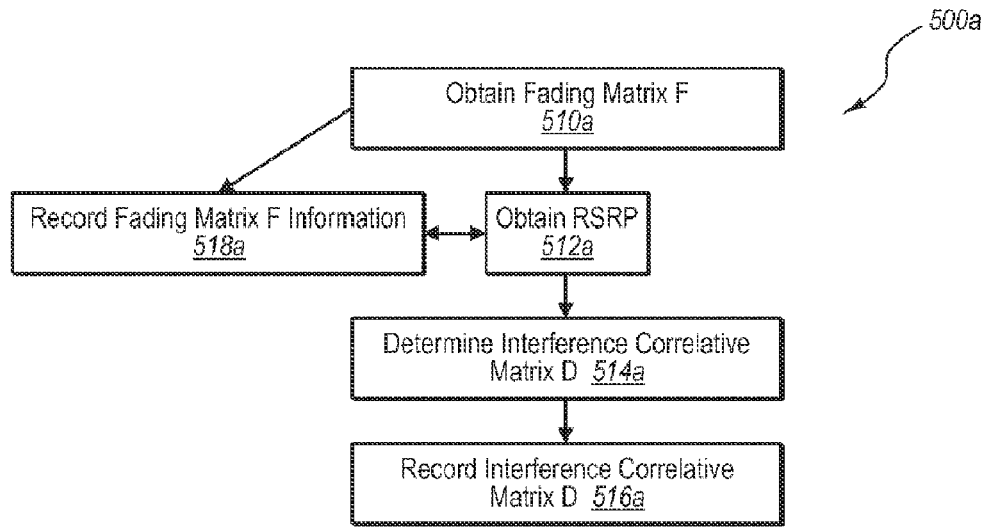
FIG. 5A includes a flow diagram representing a process that can be implemented in a method for reducing interference between femtocell systems in a femtocell environment.

FIG. 5A provides a flow diagram of a method 500a for using a fading matrix F in order to improve interference between femtocell systems. The method 500a can include the first femtocell system obtaining a fading matrix F of the first femtocell channels between the first femtocell system and one other femtocell system, and/or the other femtocell system determining its fading matrix F ("OBTAIN FADING MATRIX F," block 510a). The fading matrix F can be obtained by the first femtocell system obtaining a reference signal received power (RSRP) from at least one of the other femtocell systems ("OBTAIN RSRP," block 512a). The RSRP is measured by a different femtocell system in order to determine how the signal of the first femtocell system fades as it reaches out toward the other femtocell system, and vice versa. The fading matrix F from the first femtocell system to another femtocell system, such as femtocell$_i$, is represented by $F_{o,i}$, where $F_o$ is the fading from the first femtocell system and $F_i$ is the fading from the other femtocell system. The fading matrix F can be obtained from fading values.

Once the fading matrix F is obtained, the femtocell system can then determine an interference correlative matrix D that corresponds with the fading values of the fading matrix F relative to a predetermined threshold value $\Gamma_T$ ("DETERMINE INTERFERENCE CORRELATIVE MATRIX D," block 514a). The interference correlative matrix D can be determined by, if $F_{o,i}$ is less than a predetermined threshold value $\Gamma_F$ (e.g., $\Gamma_F$ is the fading value threshold for the transmitting femtocell F), then the interference correlative matrix D from the first femtocell system to the other femtocell$_i$ system, $D_{o,i}$, is equal to 1 (i.e., if $F_{o,i} < \Gamma_F$, then $D_{o,i} = 1$). Each femtocell system broadcasts channel quality information $\gamma_i$ of the subordinate devices served by the particular femtocell system for each carrier wave k in a certain period of time. Each femtocell system records the information related to the fading matrix F and interference correlative matrix D ("RECORD FADING MATRIX F INFORMATION," Block 518a; "RECORD INTERFERENCE CORRELATIVE MATRIX D," Block 516a). Each femtocell system can perform this process to obtain initialization information for each channel.

The correlative matrix D reflects the interference relationship between different femtocell systems. $D_{ij} = 1$ indicates that the fading between femtocell i and femtocell j is smaller than a certain threshold, thus the two different femtocells probably interfere with each other. Only femtocells interfering with each other need to negotiate the usage of carriers because the carrier usage of other femtocells with no interference does not affect the current femtocell.

The femtocell systems can each perform a set of processes in regard to the initialization information obtained from the method 500a. The femtocell systems can determine the order of the processes by passing instructions between them by an arbitrary process of self-optimization. Part of the process can involve the throughput of the femtocell system, which is represented by T, where the throughput T for the first femtocell can be $T_o$. Correspondingly, the throughput of the first femtocell system of carrier wave k can be represented by $T_o^k$.

Figure 5B:
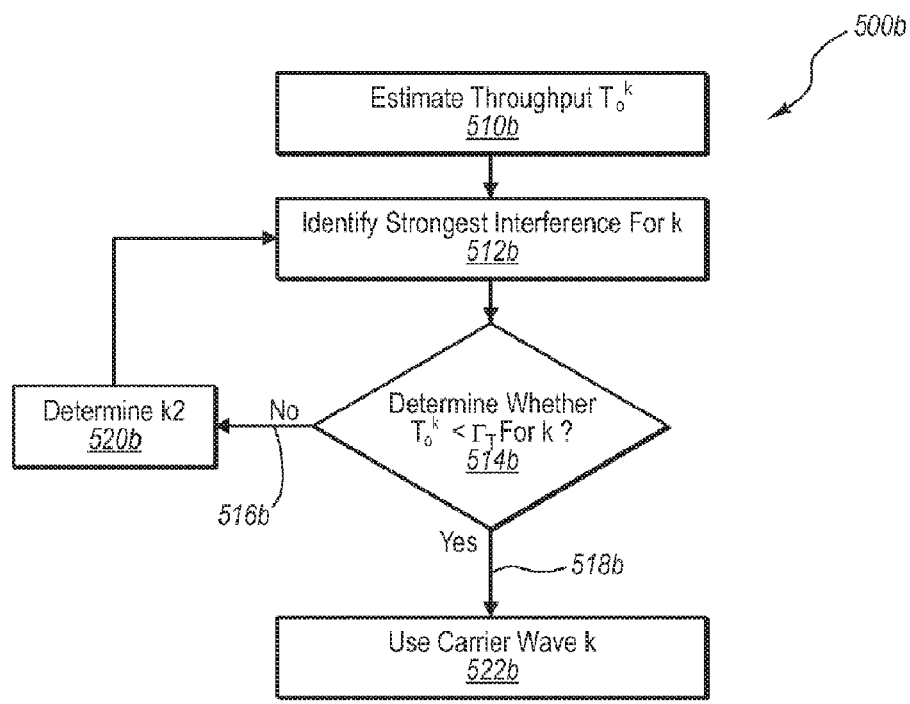
FIG. 5B includes a flow diagram representing an embodiment of a process for determining whether or not to use a certain carrier wave or a different carrier wave.

FIG. 5B provides a flow diagram of a method 500b of estimating the influence of a use of a resource on the communications system. As such, the method 500b can include estimating the throughput $T_o^k$ of the first femtocell system which can be obtained on a carrier wave k ("ESTIMATE THROUGHPUT $T_o^k$," (block 510b). The first femtocell system can then base on the RSRP received from other femtocell systems to identify a second femtocell system with the strongest interference with the first femtocell system and the carrier wave k with the strongest interference between the first femtocell system and the second femtocell system ("IDENTIFY STRONGEST INTERFERENCE FOR k," block 512b). The first femtocell system can then determine whether or not $T_o^k < \Gamma_T$, where $\Gamma_T$ corresponds to the predetermined threshold value ("DETERMINE WHETHER $T_o^k < \Gamma_T$ FOR k," block 514b). If the throughput is more than the threshold $\Gamma_T$ ("NO," block 516b), the first femtocell system identifies a second carrier wave k2. then goes back to block 510b and estimates a throughput for the second carrier wave k2 ("DETERMINE k2," block 520b). Note that the first carrier wave becomes k1. When the femtocell system cannot use the carrier wave k, the first femtocell system negotiates with the second femtocell system about using a carrier wave k2, which is at least substantially orthogonal to k1. If the throughput $T_o^k$ is less than the threshold ("YES," block 518b), the first femtocell system can use the carrier wave k1. ("USE CARRIER WAVE k," block 522b).

Accordingly, when the throughput $T_o^k$ is less than the threshold $\Gamma_T$, then the first femtocell system can negotiate with the other femtocell system in order to determine a carrier wave k to use. The first femtocell system can negotiate with the other femtocell system having the strongest interference regarding the use of one or more waves k. The negotiation can include the first femtocell system using a carrier wave k that is at least substantially orthogonal to the carrier wave k used by the other femtocell system with the strongest interference. As such, the throughput $T_o^k$ can increase for the first femtocell system to ensure fairness of the femtocell environment with regard to carrier waves used between proximal femtocell systems. Also, the first femtocell system can observe all carrier waves in a random order or in a predetermined order. When the carrier waves being used by the first femtocell system are observed, the first femtocell system can calculate the throughput $T_o^k$ of a carrier wave k. For other femtocell systems, the first femtocell system can calculate the throughput $T_o^k$ of the carrier wave k which can be obtained on the current carrier wave k.

Figure 6:
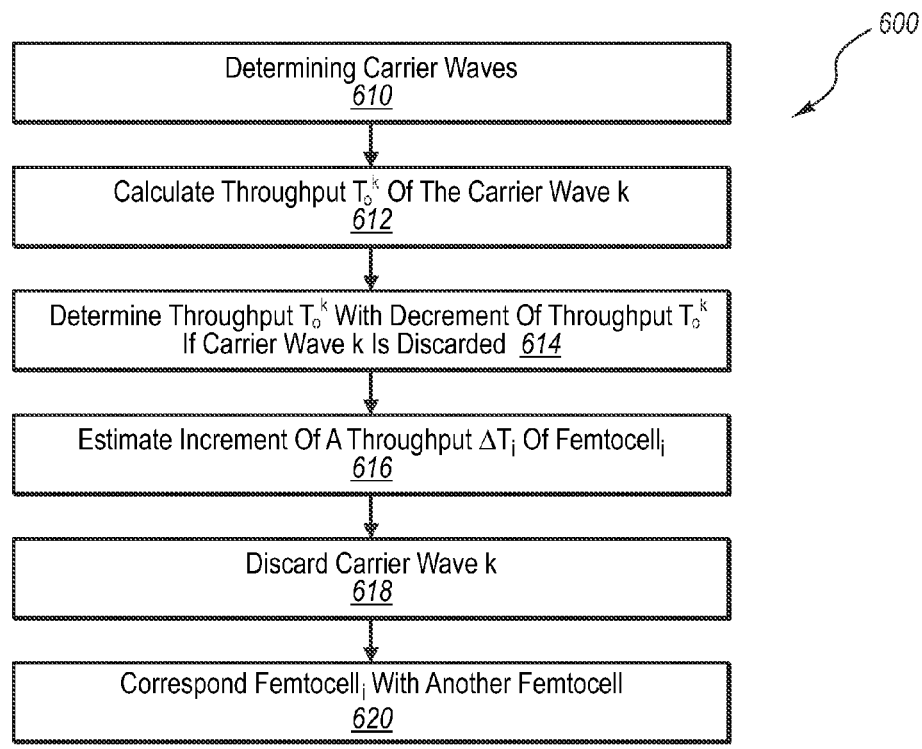
FIG. 6 includes a flow diagram representing an embodiment of a process for determining whether or not use of a carrier wave can reduce interference between femtocell systems in a femtocell environment.

FIG. 6 provides a flow diagram of another embodiment of a method 600 of estimating the influence of a use of a resource on the communications system. The method 600 can include determining which carrier waves of the first femtocell system are being used by the first femtocell system ("DETERMINING CARRIER WAVES," block 610). This determination can be performed by each of the femtocell systems in the femtocell environment as the point of reference as to which femtocell system is the first femtocell system in the estimation of influence. The first femtocell system can calculate the throughput $T_o^k$ of the carrier wave k for each of the possible carrier waves k of the femtocell environment ("CALCULATE THROUGHPUT $T_o^k$ OF THE CARRIER WAVE k," block 612). The throughput $T_o^k$ of the carrier wave k can be related to and corresponding with the decrement of the throughput for the first femtocell system if the first femtocell system discards the carrier wave k ("DETERMINE THROUGHPUT $T_o^k$ WITH DECREMENT OF THROUGHPUT $T_o^k$ IF CARRIER WAVE k IS DISCARDED," BLOCK 614). However, the throughput $T_o^k$ of the carrier wave k can automatically correspond with the decrement of throughput $T_o^k$ and no actual comparison process may need to be performed. The decrement of throughput $T_o^k$ can be determined by the first femtocell system as the first femtocell system may be actively attempting to optimize interference with another femtocell system, such as the femtocell$_i$ system. The first femtocell can then estimate the increment of a throughput $\Delta T_i$ of femtocell$_i$, after the first femtocell system discards the carrier wave k ("ESTIMATE INCREMENT OF A THROUGHPUT $\Delta T_i$ OF FEMTOCELL$_i$," block 616). The estimation of the a throughput $\Delta T_i$ of Femtocell$_i$ can be from a hypothetical scenario or the first femtocell system can actually discard the carrier wave k ("DISCARD CARRIER WAVE k," block 618). The femtocell$_i$ can correspond with one or more of any other femtocell system in the femtocell environment ("CORRESPOND FEMTOCELL, WITH ANOTHER FEMTOCELL," block 620). The femtocell$_i$ can correspond with one or more other femtocell systems of the femtocell environment relative to the first femtocell system. The femtocell$_i$ system can correspond with at least one other femtocell systems in a set I of the other femtocell systems. The femtocell$_i$ system can correspond with other femtocell systems in a set I of the other femtocell systems, where the fading value is less than the predetermined threshold value $\Gamma_T$.

The method 600 can include: for each of the carrier waves being used by the first femtocell system, the first femtocell system calculates the throughput $T_o^k$ of the carrier wave k corresponding what the decrement of the throughput will be on the first femtocell system if the first femtocell system discards the carrier wave k, and the first femtocell system can estimate the increment of a throughput $\Delta T_i$ of femtocell$_i$ system after the first femtocell system discards the carrier wave k, where i corresponds to one or more of the at least one other femtocell systems in a set I of the other femtocell systems where fading value is less than the predetermined threshold value $\Gamma_T$.

Accordingly, the first femtocell can calculate the throughput $T_o^k$ be obtained on the current carrier wave k, which can be the decrement of the throughput of the femtocell environment when the first femtocell discards the carrier wave k. Also, the first femtocell system can estimate the increment of the throughput $\Delta T_i$ of another femtocell$_i$ system after the carrier wave k is discarded.

$$(i \in I, I = \{j | D_{o,j} = 1\})$$

Figure 7:
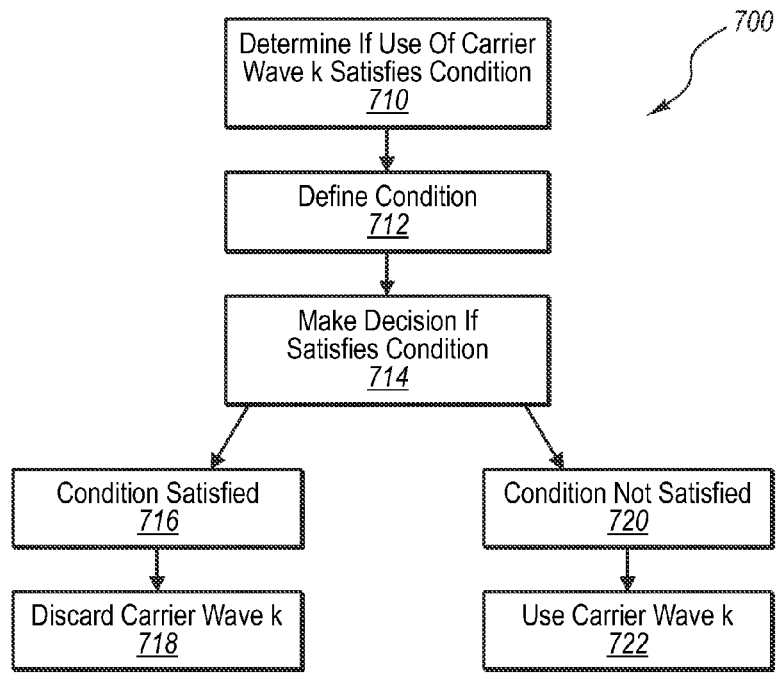
FIG. 7 includes a flow diagram representing an embodiment of a process for determining whether to use a certain carrier wave or to discard a certain carrier wave in a femtocell environment to reduce interference.

FIG. 7 provides a flow diagram of an embodiment of a method 700 of determining whether to use a resource. The method 700 can be conducted at the first femtocell system. The method 700 can include discarding the carrier wave k under a first condition or continuing to use the carrier wave k under a second condition. Accordingly, the first femtocell system can determine whether or not use of the carrier wave k satisfies a condition ("DETERMINE IF USE OF CAR- RIER WAVE k SATISFIES CONDITION," block 710). The first femtocell can define the condition with Equation (1) as follows ("DEFINE CONDITION," block 712):

$$T_0^k > \sum_{i \in I} \Delta T_i \quad (1)$$

The first femtocell system can then make a decision based on whether the use of the carrier wave k satisfies the condition or not ("MAKE DECISION IF SATISFIES CONDITION," block 714). If the condition is satisfied ("CONDITION SATISFIED," block 716), the first femtocell system can discard the carrier wave k ("DISCARD CARRIER WAVE k," block 718). If the condition is not satisfied ("CONDITION NOT SATISFIED," block 720), the first femtocell can continue to use the carrier wave k ("USE CARRIER WAVE k," block 722). However, the equation can have the inequality in the other direction such that the throughput $T_o^k$ is less than increment of throughput $\Delta T_i$, and then the opposite decision will be made regarding whether or not to use the carrier wave k or discard the carrier wave k.

Accordingly, the method 700 can include: determining at the first femtocell system whether to use the resource upon satisfaction or non-satisfaction of Equation (1). The first femtocell system can discard the carrier wave k if $T_o^k$ and $\Delta T_i$ satisfy the Equation (1). On the other hand, the first femtocell can continue to use the carrier wave k if $T_o^k$ and $\Delta T_i$ do not satisfy the Equation (1).

The femtocell environment can calculate values through the first femtocell system making the calculation or any other femtocell system making the calculation, and the femtocell systems can provide the information between each other. If the throughput $T_o^k$ is greater than the increment $\Delta T_i$, then the first femtocell system can discard the carrier wave k. If the throughput $T_o^k$ is less than the increment $\Delta T_i$, then the first femtocell system can use the carrier wave k. With regard to Equation (1), the femtocell environment can ensure that no decrease of the whole throughput of the femtocell environment occurs when the first femtocell system discards the carrier wave k. This can allow the femtocell environment to have overall improved performance. The process can be performed at each femtocell system.

The estimation of the throughput $T_o^k$ could include various processes. The distances between the femtocell systems having strong interference with each other may be relatively small, so that the interferences with them are similar to each other. The interferences suffered by another femtocell system can be approximated to the interference $I_0$ suffered by the first femtocell system. Also, the channel quality $\gamma_i'$ of another femtocell system when the first femtocell system discards the current carrier wave k can be estimated according to the channel quality information $\gamma_i$ of the subordinate device served by the other femtocell system. The channel quality information $\gamma_i$ can be obtained during initialization. The fading value $F_{0,i}$ between the first femtocell system (e.g., femtocell$_0$) and another femtocell system (e.g., femtocell$_i$) and the transmission power $P_0$ of the first femtocell system can be estimated or determined, and which can be used during the process.

Figure 8:
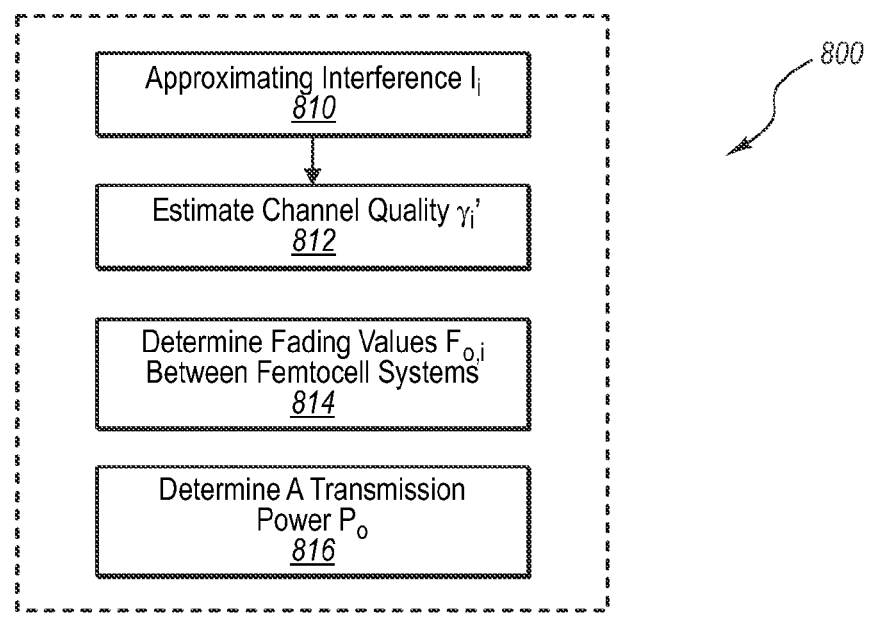
FIG. 8 includes some processes that can be performed during any of the methods for reducing interference in a femtocell environment.

FIG. 8 provides a flow diagram of an embodiment of a method 800 of estimating an increment of the throughput $\Delta T_i$ of a femtocell system (e.g., femtocell$_i$) other than the first femtocell system. The first femtocell system or the other femtocell system can perform the estimation. As such, the method 800 can include approximating an interference $I_i$ of each of the other femtocell$_i$ systems in the set I as being equal to an interference $I_0$ of the first femtocell system ("APPROXIMATING INTERFERENCE $I_i$," block 810). The approximating can be performed by the first femtocell system, or it can be done by another femtocell system and the approximation can be shared. The method 800 can include estimating a channel quality $\gamma_i'$ using channel quality information $\gamma_i$ received at the first femtocell system, the fading status $F_{0,i}$ between the first femtocell system and each of the at least one other femtocell$_i$ systems in the set I, and a transmission power $P_0$ of the first femtocell system ("ESTIMATE CHANNEL QUALITY $\gamma_i'$," block 812). Also, the method 800 can include determining a fading status $F_{0,i}$ between the first femtocell system and each of the at least one other femtocell$_i$ systems in the set I ("DETERMINE FADING STATUS BETWEEN FEMTOCELL SYSTEMS," block 814). Also, the fading status $F_{0,i}$ can be determined between the first femtocell system and $I_i$ of each of the at least one other femtocell$_i$ systems in the set I. The method 800 can include determining a transmission power $P_0$ of the first femtocell system ("DETERMINE A TRANSMISSION POWER $P_0$," block 816). The foregoing estimations of method 800 can be performed according to the following equations, Equation (2), Equation (3), and Equation (4):

$$\gamma_i = \frac{P_i}{I_i + N} \approx \frac{P_i'}{I_0 + N} \quad (2)$$

$$P_i' \approx \gamma_i \times (I_0 + N) \quad (3)$$

$$\gamma_i' = \frac{P_i}{I_0 - (P_0 - F_{0,i}) + N} \quad (4)$$

In the foregoing equations, the parameters are as follows: $P_i$ is transmission power of femtocell$_i$, $I_i$ is interference power received by femtocell$_i$, $P_i'$ is an estimation of the transmission power of femtocell$_i$ by the first femtocell system, and N is noise power. The first femtocell system can calculate the throughput increment $\Delta T_i$ when it discard the carrier wave k, by $\Delta T_i = T_i' - T_i$. The parameters can be defined, estimated, or determined.

Figure 9:
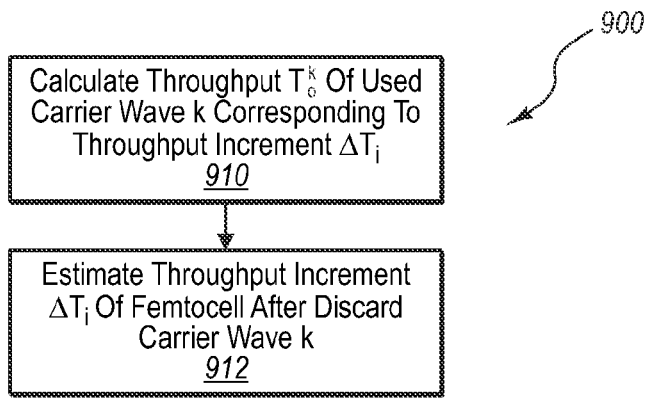
FIG. 9 includes a flow diagram representing a process that can be used in a method for reducing interference between femtocell systems in a femtocell environment.

FIG. 9 provides a flow diagram of an embodiment of a method 900 of estimating the influence of a use of a resource on the communications system in the femtocell environment. The one of the femtocell systems can calculate the throughput of the carrier wave k corresponding to the increment $\Delta T_i$ of the throughput in the femtocell environment when the first femtocell system uses the carrier wave k ("CALCULATE THROUGHPUT $T_o^k$ OF USED CARRIER WAVE CORRESPONDING TO THROUGHPUT INCREMENT $\Delta T_i$," block 910). As such, for each of the carrier waves not being used by the first femtocell system, the first femtocell can calculate the throughput $T_o^k$ of the carrier wave k corresponding to the increment of the throughput $\Delta T_i$ on the communication system when the first femtocell system uses the carrier wave k. The first femtocell system can estimate the increment of the throughput $\Delta T_i$ of femtocell$_i$ after the first femtocell discards the carrier wave k ("ESTIMATE THROUGHPUT INCREMENT $\Delta T_i$ OF FEMTOCELL AFTER DISCARD CARRIER WAVE k," block 912). Accordingly, i corresponds to each of the at least one other femtocell systems in a set I of the other femtocell systems where fading value is less than the predetermined threshold value $\Gamma_T$.

Figure 10:
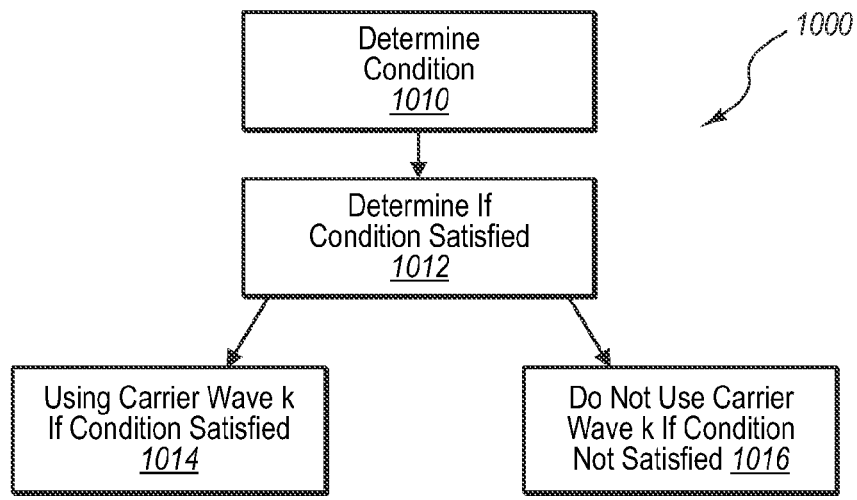
FIG. 10 includes a flow diagram representing a process for determining whether or not to use a certain carrier wave in a femtocell environment.

FIG. 10 provides a flow diagram of an embodiment of a method 1000 of determining whether to use a resource. This method 1000 can be performed by the femtocell system determining whether or not to use a resource, such as the first femtocell system. A condition can be defined in order to use as a basis to determine whether or not to use a resource ("DETERMINE CONDITION," block 1010). The method 1000 can then determine if the condition is satisfied ("DETERMINE IF CONDITION SATISFIED," block 1012). The method 1000 can include using the carrier wave k at the first femtocell system if $T_o^k$ and $\Delta T_i$ satisfy the Equation (5) ("USING CARRIER WAVE k IF CONDITION SATISFIED," block 1014), where Equation (5) can be the condition:

$$\frac{\Delta T_i}{T_i} < \frac{T_0^k}{T_0 \times |I_0|} \quad (5)$$

The parameters can include where $|I_0|$ is the number of elements in the set I of the other femtocell systems where fading value is less than the predetermined threshold value. Alternatively, when the condition is not satisfied, the first femtocell system may not use the carrier wave k ("DO NOT USE CARRIER WAVE k IF CONDITION NOT SATISFIED," block 1016). For example, this can include not using the carrier wave k if $T_o^k$ and $\Delta T_i$ do not satisfy the Equation (5).

Figure 11:
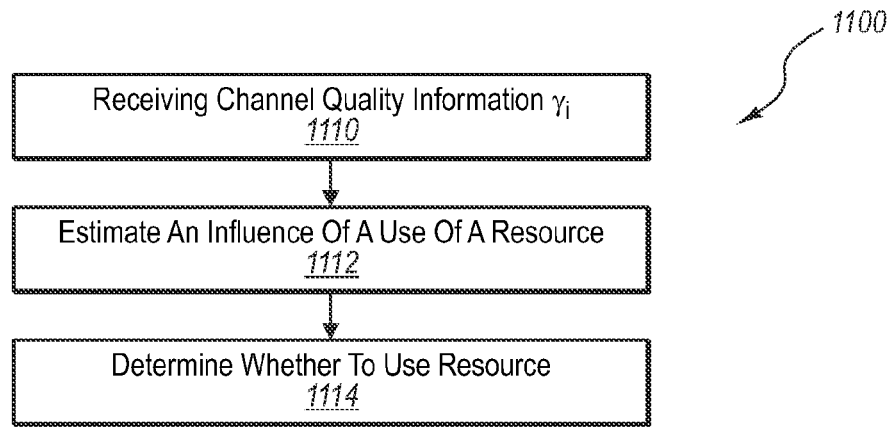
FIG. 11 includes a flow diagram representing a process for determining whether or not to use a certain resource in a femtocell environment.

FIG. 11 provides a flow diagram of an embodiment of a method 1100 of distributed inter-cell interference coordination in a femtocell system that is performed at the first femtocell system. The method 1100 can include the first femtocell system receiving channel quality information $\gamma_i$ of a subordinate device communicating with at least one other femtocell system interfering with the first femtocell in a communications network ("RECEIVING CHANNEL QUALITY INFORMATION $\gamma_i$," block 1110). The first femtocell system can then estimate an influence of a use of a resource on the communications system according to the channel quality information $\gamma_i$ received by each of the at least one other femtocell system ("ESTIMATE AN INFLUENCE OF A USE OF A RESOURCE," block 1112). The first femtocell system can then determine whether or not to use the resource based on the channel quality information $\gamma_i$ ("DETERMINE WHETHER TO USE RESOURCE," block 1114). The method 1100 may also optionally include storing the channel quality information $\gamma_i$ of the at least one other femtocell system as described in connection to FIG. 4. Accordingly, any of the processes of any of the blocks of any of the flow diagrams of any of the figures can be used in any of the other method, such as this method, in order to facility reduction of interference in a femtocell environment. Also, any process or step described herein can be included in any of the methods described herein and/or illustrated as flow diagrams in the figures.

In one embodiment, the first femtocell system can receive channel quality information $\gamma_i$ of a subordinate device by receiving a broadcast of the channel quality information $\gamma_i$ of each carrier wave k from one or more other femtocell systems in a certain time period. The first femtocell device can then obtain a fading matrix F of fading values between the first femtocell system and the other femtocell system, and determine an interference correlative matrix D corresponding to the fading matrix relative to a predetermined threshold value $\Gamma_T$.

In one embodiment, the first femtocell system can estimate the throughput $T_o^k$ of the first femtocell system which can be obtained on a carrier wave k.

In one embodiment, the first femtocell system can estimate the influence of a use of a resource on the communications system. This can include using the interference correlative matrix D to identify a second femtocell system with the strongest interference with the first femtocell system and the carrier wave k1 with the strongest interference between the first femtocell system and the second femtocell system. If $T_0^k < \Gamma_T$ is not correct, where $\Gamma_T$ corresponds to the predetermined threshold value, then the first femtocell system negotiates with the second femtocell system about using a carrier wave k2, which is at least substantially orthogonal to k1. If $T_0^k < \Gamma_T$ is correct, then the first femtocell system negotiates with the second femtocell system about using a carrier wave k1.

In one embodiment, the first femtocell system can initiate an estimate of the influence of a use of a resource on the communications system by determining which carrier waves of the first femtocell system are being used by the first femtocell system. The first femtocell can then: for each of the carrier waves being used by the first femtocell system, calculate the throughput $T_0^k$ of the carrier wave k corresponding what the decrement of the throughput will be on the first femtocell system if the first femtocell system discards the carrier wave k, and estimate the increment of the throughput $\Delta T_i$ of femtocell$_i$, after the first femtocell system discards the carrier wave k, where i corresponds to each of the at least one other femtocell systems in a set I of the other femtocell systems where fading value is less than the predetermined threshold value $\Gamma_T$.

In one embodiment, the first femtocell system can discard the carrier wave k at the first femtocell system if $T_0^k$ and $\Delta T_i$ satisfy the Equation (1), or continue to use the carrier wave k if $T_0^k$ and $\Delta T_i$ do not satisfy the Equation (1). Also, the Equation (1) can be rearranged to have the opposite inequality and then this embodiment is reversed in terms of whether or not to discard the carrier wave or continue to use the carrier wave.

In one embodiment, the first femtocell system can estimate the increment of the throughput $\Delta T_i$ of femtocell$_i$, after the first femtocell system discards the carrier wave. This process can include: approximating an interference $I_i$ of each of the at least one other femtocell$_i$ systems in the set I as being equal to an interference $I_0$ of the first femtocell system; estimating channel quality $\gamma_i'$ using channel quality information $\gamma_i$ received at the first femtocell system, a fading status $F_{0,i}$ between the first femtocell system and each of the at least one other femtocell$_i$ systems in the set I, a fading status between the first femtocell system and $I_i$ of each of the at least one other femtocell$_i$ systems in the set I; and/or a transmission power $P_0$ of the first femtocell according to Equation (2), Equation (3), and Equation (4), with the parameters as described herein.

In one embodiment, for each of the carrier waves not being used by the first femtocell system, the first femtocell system can calculate the throughput $T_0^k$ of the carrier wave k corresponding to the increment of the throughput $\Delta T_i$ on the communication system when the first femtocell system uses the carrier wave k. The first femtocell can then estimate the increment of the throughput $\Delta T_i$ of femtocell$_i$, after the first femtocell system discards the carrier wave k, where i corresponds to each of the at least one other femtocell systems in a set I of the other femtocell systems where fading value is less than the predetermined threshold value $\Gamma_T$.

In one embodiment, the first femtocell system can use the carrier wave k at the first femtocell system if $T_0^k$ and $\Delta T_i$ satisfy the Equation (5), where $|I_0|$ is the number of elements in the set I of the other femtocell systems where fading value is less than the predetermined threshold value $\Gamma_T$. On the other hand, the first femtocell system may not use the carrier wave k if $T_0^k$ and $\Delta T_i$ do not satisfy the Equation (5).

In one embodiment, the first femtocell system can estimate a channel quality $\gamma_i'$ using channel quality information $\gamma_i$ received at the first femtocell system, using a fading value $F_{o,i}$ between the first femtocell system and each of the at least one other femtocell$_i$ systems in the set I, using a fading status between the first femtocell and $I_i$ of each of the at least one other femtocell$_i$ systems in the set I, and/or using a transmission power $P_0$ of the first femtocell system according to Equation (2), Equation (3), and Equation (4).

The femtocell systems described herein and methods of operation can be implemented by a HeNB system. Such a HeNB system can be configured to have the ability for downlink receiving of data. Also, the HeNB can obtain the fading information directly by measurements at the HeNB. Each HeNB can broadcast the channel quality information of a mobile device, such as a subordinate mobile device, served by the present HeNB. The HeNB can use interfaces between proximal HeNBs to implement an ICIC algorithm. The proximal HeNBs can make reasonable assessments about interference experienced by one HeNB that is interfering with another HeNB. The proximal HeNBs work together to reduce interference.

Figure 12:
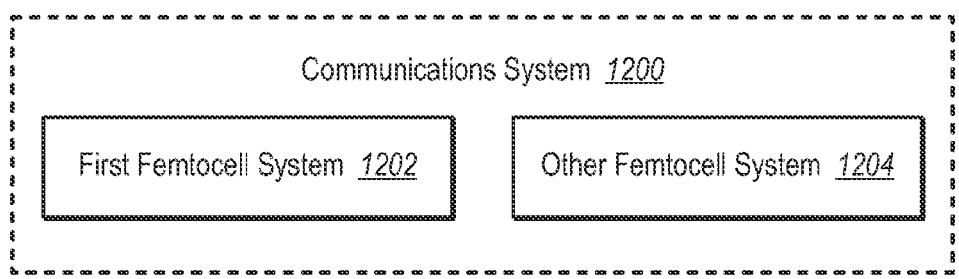
FIG. 12 provides a schematic representation of a simple femtocell environment, all arranged in accordance with at least one of the embodiments described herein, and which arrangement may be modified in accordance with the disclosure provided herein by one of ordinary skill in the art.

The methods described herein to reduce interference in a femtocell environment can be implemented by a communications system. As such, FIG. 12 illustrates such a communications system 1200. The minimum communications system 1200 can include a first femtocell system 1202 and at least one other femtocell system 1204. The dashed line box shows the first femtocell system 1202 and the other femtocell system 1204 are in the same femtocell environment and can have interference. The other femtocell system can be configured to send channel quality information $\gamma_i$ of a subordinate device communicating with the other femtocell system to the first femtocell system. The first femtocell system can be configured to receive the channel quality information $\gamma_i$ of the at least one other femtocell system. The first femtocell system can also be configured to estimate an influence of a use of a resource on the communications system according to the channel quality information $\gamma_i$ received by each of the at least one other femtocell system. The first femtocell system can then determine whether to use the resource. The first femtocell can be further configured to store the channel quality information $\gamma_i$ of the at least one other femtocell system of the first femtocell system. The various femtocell systems can be configured to send channel quality information $\gamma_i$ of a subordinate device by broadcasting the channel quality information $\gamma_i$ of each carrier wave k of the in a certain time period. Any of the femtocells can broadcast such information to the other proximal femtocells in the femtocell environment.

In one embodiment, the first femtocell can be configured to: obtain a fading matrix F of fading values between the first femtocell system and at least on other femtocell system. The first femtocell system can then determine an interference correlative matrix D at the first femtocell system corresponding to a fading matrix F determined by facing values relative to a predetermined threshold value $\Gamma_T$. The first femtocell system can be configured to estimate the influence of a use of a resource on the communications system comprises estimating the throughput $T_0^k$ of the first femtocell system which can be obtained on a carrier wave k.

In one embodiment, the first femtocell system can be configured to estimate the influence of a use of a resource on the communications system. Such a configuration can facilitate the ability to use the interference correlative matrix D to identify a second femtocell system with a strongest interference with the first femtocell system and the carrier wave k1 with the strongest interference between the first femtocell system and the second femtocell system. If not $T_0^k < \Gamma_T$, where $\Gamma_T$ corresponds to the predetermined threshold value, the first femtocell system negotiates with the second femtocell system about using a carrier wave k2, which is at least substantially orthogonal to k1. If $T_0^k < \Gamma_T$, the first femtocell system negotiates with the second femtocell system about using a carrier wave k1.

In one embodiment, the first femtocell system can be configured to estimate the influence of a use of a resource on the communications system. This can include being configured to determine which carrier waves of the first femtocell system are being used by the first femtocell system. The first femtocell system can be configured to estimate the influence of a use of a resource on the communications system by: for each of the carrier waves being used by the first femtocell system, the first femtocell system calculates the throughput of the carrier wave k corresponding what the decrement of the throughput will be on the first femtocell system if the first femtocell system discards the carrier wave k; and estimating the increment of the throughput $\Delta T_i$ of femtocell$_i$, after the first femtocell system discards the carrier wave k, where i corresponds to each of the at least one other femtocell systems in a set I of the other femtocell systems where fading value is less than the predetermined threshold value $\Gamma_T$.

In one embodiment, the first femtocell system can be configured to determine whether to use the resource by: discarding the carrier wave k at the first femtocell system if $T_0^k$ and $\Delta T_i$ satisfy the Equation (1), or continuing to use the carrier wave k if $T_0^k$ and $\Delta T_i$ do not satisfy the Equation (1).

In one embodiment, the first femtocell system can be configured to estimate the increment of the throughput $\Delta T_i$ of femtocell$_i$, after the first femtocell system discards the carrier wave, which can include: approximating an interference $I_i$ of each of the other femtocell$_i$ systems in the set I as being equal to an interference $I_0$ of the first femtocell system; and estimating channel quality $\gamma_i'$ using channel quality information $\gamma_i$ received at the first femtocell system, a fading status $F_{o,i}$ between the first femtocell system and each of the other femtocell$_i$ systems in the set I, a fading status $F_{0,1}$ between the first femtocell system and $I_i$ of each of the at least one other femtocell$_i$ systems in the set I, and a transmission power $P_0$ of the first femtocell system. The estimations can be performed according to Equation (2), Equation (3), and Equation (4), defined herein. As such, the first femtocell system can be configured to determine the following: $P_i$ being transmission power of femtocell$_i$; $I_i$ being the interference power received by femtocell$_i$; $P_i'$ being an estimation of the transmission power of femtocell$_i$ by the first femtocell system; and N is noise power.

In one embodiment, the first femtocell system can be configured to estimate the influence of a use of a resource on the communications system. Such a configuration can include: for each of the carrier waves not being used by the first femtocell system, calculating the throughput $T_0^k$ of the carrier wave k corresponding to the increment of the throughput $\Delta T_i$ on the communication system when the first femtocell system uses the carrier wave k. It can also include estimating the increment of the throughput $\Delta T_i$ of femtocell$_i$, after the first femtocell system discards the carrier wave k, where i corresponds to each of the at least one other femtocell systems in a set I of the other femtocell systems where fading value is less than the predetermined threshold value $\Gamma_T$.

In one embodiment, the first femtocell system can determine whether to use the resource, which can include: using the carrier wave k at the first femtocell system if $T_0^k$ and $\Delta T_i$ satisfy the Equation (5), where $|I_0|$ is the number of elements in the set I of the other femtocell systems where fading value is less than the predetermined threshold value $\Gamma_T$; or not using the carrier wave k if $T_0^k$ and $\Delta T_i$ do not satisfy the Equation (5).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware. The modules recited herein can include hardware and/or software.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Each femtocell system can include the features of a computing device. FIG. 3 shows an example computing device 300 that is arranged for operating with the systems described herein. Particularly, the computing device 300 illustrated can be configured as a femtocell system or be included in a femtocell system. Also, the various components of the computing device 300 can be included in the femtocell of FIG. 2. The computing device 300 can be arranged with or operably coupled with any of the components, network, and/or system in accordance with at least some embodiments described herein. In a very basic configuration 302, computing device 300 generally includes one or more processors 304 and a system memory 306. A memory bus 308 may be used for communicating between processor 304 and system memory 306.

Depending on the desired configuration, processor 304 may be of any type including but not limited to a microprocessor (μP), a microcontroller (μC), a digital signal processor (DSP), or any combination thereof. Processor 304 may include one more levels of caching, such as a level one cache 310 and a level two cache 312, a processor core 314, and registers 316. An example processor core 314 may include an arithmetic logic unit (ALU), a floating point unit (FPU), a digital signal processing core (DSP Core), or any combination thereof. An example memory controller 318 may also be used with processor 304, or in some implementations memory controller 318 may be an internal part of processor 304.

Depending on the desired configuration, system memory 306 may be of any type including but not limited to volatile memory (such as RAM), non-volatile memory (such as ROM, flash memory, etc.) or any combination thereof. System memory 306 may include an operating system 320, one or more applications 322, and program data 324. Application 322 may include a determination application 326 that is arranged to perform the functions as described herein. Program Data 324 may include determination information 328 that may be useful for analyzing information. In some embodiments, application 322 may be arranged to operate with program data 324 on operating system 320 such that the work performed by untrusted computing nodes can be verified as described herein. This described basic configuration 302 is illustrated in FIG. 3 by those components within the inner dashed line.

Computing device 300 may have additional features or functionality, and additional interfaces to facilitate communications between basic configuration 302 and any required devices and interfaces. For example, a bus/interface controller 330 may be used to facilitate communications between basic configuration 302 and one or more data storage devices 332 via a storage interface bus 334. Data storage devices 332 may be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 306, removable storage devices 336 and non-removable storage devices 338 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 300. Any such computer storage media may be part of computing device 300.

Computing device 300 may also include an interface bus 340 for facilitating communication from various interface devices (e.g., output devices 342, peripheral interfaces 344, and communication devices 346) to basic configuration 302 via bus/interface controller 330. Example output devices 342 include a graphics processing unit 348 and an audio processing unit 350, which may be configured to communicate to various external devices such as a display or speakers via one or more A/V ports 352. Example peripheral interfaces 344 include a serial interface controller 354 or a parallel interface controller 356, which may be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which may be arranged to facilitate communications with one or more other computing devices 362 over a network communication link (i.e., network 118) via one or more communication ports 364.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 300 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 300 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application.

The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

The symbols used herein can be defined as follows: throughput T; carrier wave k; carrier wave k1; carrier wave k2; fading matrix F; fading value between femtocells 0,i $F_{0,i}$; interference correlative matrix D; predetermined threshold value $\Gamma_T$; throughput increment $\Delta T_i$ of Femtocell$_i$; i corresponds to one or more other femtocell systems in a set I of the one or more other femtocell systems; interference $I_i$ of femtocell$_i$; interference $I_0$ of the first femtocell system; estimated channel quality $\gamma_i'$; channel quality information $\square_i$; transmission power $P_0$ of the first femtocell system; $P_i$ is transmission power of femtocell$_i$; $I_i$ is interference power received by femtocell$_i$; $P_i'$ is an estimation of the transmission power of femtocell$_i$ by the first femtocell system; N is noise power; and $|I_0|$ is the number of elements in the set I of the other femtocell systems where fading value is less than the predetermined threshold value $\Gamma_T$.

The relationships provided herein include: If not $T_0^k < \Gamma_T$ for k1 then use second carrier wave k2; If $T_0^k < \Gamma_T$ for k1 then use first carrier wave k1; If $T_0^k > \Sigma_{i \in I} \Delta T_i$ then discard carrier wave k; and If not $T_0^k > \Sigma_{i \in I} \Delta T_i$ then use carrier wave k.

The equations provided herein include:

$$T_0^k > \sum_{i \in I} \Delta T_i \tag{1}$$

$$\gamma_i = \frac{P_i}{I_i + N} \approx \frac{P_i'}{I_0 + N} \tag{2}$$

$$P_i' \approx \gamma_i \times (I_0 + N) \tag{3}$$

$$\gamma_i' = \frac{P_i}{I_0 - (P_0 - F_{0,i}) + N} \tag{4}$$

$$\frac{\Delta T_i}{T_i} < \frac{T_0^k}{T_0 \times |I_0|} \tag{5}$$

What is claimed is:

1. A method of improving distributed inter-cell interference in a communication system including at least a first femtocell system and one or more other femtocell systems, the method comprising:
   obtaining by the first femtocell system a reference signal received power (RSRP) from one or more other femtocell systems;
   obtaining a fading matrix F at the first femtocell system of fading values between the first femtocell system and the one or more other femtocell systems based on the RSRP;

determining an interference correlative matrix D at the first femtocell system corresponding to the fading matrix F relative to a predetermined threshold value $\Gamma_T$; and estimating an influence of a use of a resource on the communications system at the first femtocell system based at least partially on the interference correlative matrix D.

2. The method of claim 1, further comprising recording information related to the fading matrix F and interference correlative matrix D at one or more of the first femtocell system and the one or more other femtocell systems.

3. The method of claim 1, wherein estimating an influence of a use of a resource on the communications system comprises estimating a throughput $T_0^k$ of the first femtocell system which can be obtained on a carrier wave k.

4. The method of claim 3, wherein estimating an influence of a use of a resource on the communications system further comprises:

using the interference correlative matrix D to identify a second femtocell system with strongest interference with the first femtocell system and a carrier wave k1 with the strongest interference between the first femtocell system and the second femtocell system, wherein if not $T_0^k < \Gamma_T$, where $\Gamma_T$ corresponds to the predetermined threshold value, the first femtocell system negotiates with the second femtocell system about using a carrier wave k2, which is at least substantially orthogonal to the carrier wave k1, wherein if $T_0^k < \Gamma_T$, the first femtocell system negotiates with the second femtocell system about using the carrier wave k1.

5. The method of claim 4, wherein estimating an influence of a use of a resource on the communications system further comprises:

determining which carrier waves of the first femtocell system are being used by the first femtocell system;

for each of the carrier waves being used by the first femtocell system, the first femtocell system calculates the throughput $T_0^k$ of the carrier wave k corresponding to what the decrement of the throughput will be on the first femtocell system if the first femtocell system discards the carrier wave k; and estimating an increment of throughput $\Delta T_i$ of Femtocell$_i$, after the first femtocell system discards the carrier wave k, where i corresponds to one or more other femtocell$_i$ systems in a set I of the one or more other femtocell systems where fading value is less than the predetermined threshold value $\Gamma_T$.

6. The method of claim 5, wherein estimating an increment of throughput $\Delta T_i$ of femtocell$_i$, after the first femtocell system discards the carrier wave k comprises approximating an interference $I_i$ of each of the other femtocell$_i$ systems in the set I as being equal to an interference $I_0$ of the first femtocell system.

7. The method of claim 6, wherein estimating an influence of a use of a resource on the communications system further comprises:

for each of the carrier waves not being used by the first femtocell system, calculating the throughput $T_0^k$ of the carrier wave k corresponding to the increment of the throughput $\Delta T_i$ on the communication system when the first femtocell system uses the carrier wave k; and estimating an increment of throughput $\Delta T_i$ of femtocell$_i$, after the first femtocell system discards the carrier wave k, where i corresponds to each of the at least one other femtocell systems in a set I of the other femtocell systems where fading value is less than the predetermined threshold value $\Gamma_T$.

8. The method of claim 5, further comprising determining at the first femtocell whether to use the resource wherein determining at the first femtocell whether to use the resource comprises:

discarding the carrier wave k at the first femtocell system if $T_0^k$ and $\Delta T_i$ satisfy Equation (1):

$$T_0^k > \Sigma_{i \in I} \Delta T_i; \text{ or} \qquad (1)$$

continuing to use the carrier wave k if $T_0^k$ and $\Delta T_i$ do not satisfy the Equation (1).

9. The method of claim 8, wherein determining at the first femtocell whether to use the resource further comprises:

using the carrier wave at the first femtocell system if $T_0^k$ and $\Delta T_i$ satisfy Equation (5):

$$\frac{\Delta T_i}{T_i} < \frac{T_0^k}{T_0 \times |I_0|} \qquad (5)$$

where $|I_0|$ is the number of elements in the set I of the other femtocell systems where fading value is less than the predetermined threshold value; or not using the carrier wave k if $T_0^k$ and $\Delta T_i$ do not satisfy the Equation (5).

10. The method of claim 9, wherein estimating an increment of throughput $\Delta T_i$ of femtocell$_i$, after the first femtocell system discards the carrier wave k comprises approximating an interference $I_i$ of each of the other femtocell$_i$ systems in the set I as being equal to an interference $I_0$ of the first femtocell system.

11. A first femtocell system configured to be included in a communications system with one or more other femtocell systems, the first femtocell system configured to perform operations for improving distributed inter-cell interference in the communication system, the operations comprising:

obtaining a reference signal received power (RSRP) from one or more other femtocell systems;

obtaining a fading matrix F at the first femtocell system of fading values between the first femtocell system and the one or more other femtocell systems based on the RSRP;

determining an interference correlative matrix D at the first femtocell system corresponding to the fading matrix F relative to a predetermined threshold value $\Gamma_T$; and estimating an influence of a use of a resource on the communications system at the first femtocell system based at least partially on the interference correlative matrix D.

12. The first femtocell system of claim 11, wherein the first femtocell system is further configured to record information related to the fading matrix F and interference correlative matrix D.

13. The first femtocell system of claim 11, wherein estimating an influence of a use of a resource on the communications system comprises estimating a throughput $T_0^k$ of the first femtocell system which can be obtained on a carrier wave k.

14. The first femtocell system of claim 13, wherein estimating an influence of a use of a resource on the communications system further comprises:

using the interference correlative matrix D to identify a second femtocell system with strongest interference with the first femtocell system and a carrier wave k1 with the strongest interference between the first femtocell system and the second femtocell system, wherein if not $T_0^k < \Gamma_T$, where $\Gamma_T$ corresponds to the predetermined threshold value, the first femtocell system negotiates with the second femtocell system about using a carrier wave k2, which is at least substantially orthogonal to the carrier wave k1, wherein if $T_0^k < \Gamma_T$, the first femtocell system negotiates with the second femtocell system about using the carrier wave k1.

15. The first femtocell system of claim 14, wherein estimating an influence of a use of a resource on the communications system further comprises:

determining which carrier waves of the first femtocell system are being used by the first femtocell system;

for each of the carrier waves being used by the first femtocell system, the first femtocell system calculates the throughput $T_0^k$ of the carrier wave k corresponding to what the decrement of the throughput will be on the first femtocell system if the first femtocell system discards the carrier wave k; and estimating an increment of throughput $\Delta T_i$ of Femtocell$_i$, after the first femtocell system discards the carrier wave k, where i corresponds to one or more other femtocell$_i$ systems in a set I of the one or more other femtocell systems where fading value is less than the predetermined threshold value $\Gamma_T$.

16. The first femtocell system of claim 15, wherein:

estimating an increment of throughput $\Delta T_i$ of femtocell$_i$, after the first femtocell system discards the carrier wave k comprises approximating an interference $I_i$ of each of the other femtocell$_i$ systems in the set I as being equal to an interference $I_0$ of the first femtocell system.

17. The first femtocell system of claim 16, wherein estimating an influence of a use of a resource on the communications system further comprises:

for each of the carrier waves not being used by the first femtocell system, calculating the throughput $T_0^k$ of the carrier wave k corresponding to the increment of the throughput $\Delta T_i$ on the communication system when the first femtocell system uses the carrier wave k; and estimating an increment of throughput $\Delta T_i$ of femtocell$_i$, after the first femtocell system discards the carrier wave k, where i corresponds to each of the at least one other femtocell systems in a set I of the other femtocell systems where fading value is less than the predetermined threshold value $\Gamma_T$.

18. The first femtocell system of claim 15, wherein:

the operations further comprise determining at the first femtocell whether to use the resource, and determining at the first femtocell whether to use the resource comprises:

discarding the carrier wave k at the first femtocell system if $T_0^k$ and $\Delta T_i$ satisfy Equation (1):

$$T_0^k > \Sigma_{i \in I} \Delta T_i; \text{ or} \qquad (1)$$

continuing to use the carrier wave k if $T_0^k$ and $\Delta T_i$ do not satisfy the Equation (1).

19. The first femtocell system of claim 18, wherein the determining at the first femtocell whether to use the resource further comprises:

using the carrier wave at the first femtocell system if and $\Delta T_i$ satisfy Equation (5):

$$\frac{\Delta T_i}{T_i} < \frac{T_0^k}{T_0 \times |I_0|} \qquad (5)$$

where $|I_0|$ is the number of elements in the set I of the other femtocell systems where fading value is less than the predetermined threshold value; or not using the carrier wave k if $T_0^k$ and $\Delta T_i$ do not satisfy the Equation (5).

20. The first femtocell system of claim 19, wherein:

estimating an increment of throughput $\Delta T_i$ of femtocell$_i$, after the first femtocell system discards the carrier wave k comprises approximating an interference $I_i$ of each of the other femtocell$_i$ systems in the set I as being equal to an interference $I_0$ of the first femtocell system.

\* \* \* \* \*

UNITED STATES PATENT AND TRADEMARK OFFICE
CERTIFICATE OF CORRECTION

PATENT NO. : 9,048,982 B2
APPLICATION NO. : 14/028384
DATED : June 2, 2015
INVENTOR(S) : Hu et al.

Page 1 of 1

It is certified that error appears in the above-identified patent and that said Letters Patent is hereby corrected as shown below:

In the specification,

In Column 7, Line 46, delete "INFORMATION,"" and insert -- INFORMATION $\gamma_i$," --, therefor.

In Column 10, Line 29, delete "FEMTOCELL," and insert -- FEMTOCELL$_i$, --, therefor.

In Column 16, Line 18, delete "throughput" and insert -- throughput $T_0^k$ --, therefor.

In Column 22, Line 21, delete "T;" and insert -- $T_0^k$; --, therefor.

In the claims,

In Column 26, Line 22, in Claim 19, delete "if and" and insert -- if $T_0^k$ and --, therefor.

Signed and Sealed this
Twenty-fourth Day of November, 2015

Michelle K. Lee
*Director of the United States Patent and Trademark Office*